(12) United States Patent
Storr

(10) Patent No.: US 7,072,302 B1
(45) Date of Patent: Jul. 4, 2006

(54) DATA CELL TRAFFIC MANAGEMENT

(75) Inventor: Morten Storr, Farum (DK)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/274,797

(22) Filed: Mar. 23, 1999

Related U.S. Application Data

(60) Provisional application No. 60/098,081, filed on Aug. 27, 1998.

(51) Int. Cl.
*H04L 12/06* (2006.01)

(52) U.S. Cl. .................................................. 370/236.1

(58) Field of Classification Search ............. 370/236.1, 370/232, 234, 236, 236.2
See application file for complete search history.

(56) References Cited

U.S. PATENT DOCUMENTS

| | | | |
|---|---|---|---|
| 5,491,801 A | | 2/1996 | Jain et al. |
| 5,528,591 A | * | 6/1996 | Lauer ......................... 370/231 |
| 5,633,859 A | | 5/1997 | Jain et al. ................... 370/234 |
| 5,668,951 A | | 9/1997 | Jain et al. |
| 5,675,576 A | * | 10/1997 | Kalampoukas et al. ..... 370/232 |
| 5,805,577 A | * | 9/1998 | Jain et al. ................... 370/234 |
| 5,987,031 A | * | 11/1999 | Miller et al. ................ 370/412 |
| 5,991,265 A | * | 11/1999 | Lincoln .................... 370/236.1 |
| 5,991,268 A | * | 11/1999 | Awdeh et al. ............ 370/236.1 |
| 6,011,777 A | * | 1/2000 | Kunzinger ............... 370/236.1 |
| 6,088,359 A | * | 7/2000 | Wicklund et al. ........ 370/236.1 |
| 6,301,226 B1 | * | 10/2001 | Lincoln .................... 370/236.1 |
| 6,438,107 B1 | * | 8/2002 | Somiya et al. ............. 370/233 |
| 6,556,542 B1 | * | 4/2003 | Sudo et al. .............. 370/236.1 |

OTHER PUBLICATIONS

Imran Noor Chaudri, EETIMES; Special Report, Communications Design Part 4, "ATM Switch Poses Traffic-Managing Challenge", http://pubsys.cmp.com/eet/nick/comdesign/ATMswite.html.

(Continued)

*Primary Examiner*—Chi Pham
*Assistant Examiner*—Thai Hoang
(74) *Attorney, Agent, or Firm*—Fish & Richardson P.C.

(57) ABSTRACT

A method for controlling data cell transmission in a network can be implemented at a network element through which data cells are transferred between source and destination nodes. The method includes receiving a control cell on a virtual channel from a source node, generating a management event upon receipt of the control cell, and processing the management event to compute resource management data. Upon the subsequent receipt of a control cell on a virtual channel from a destination node, the control cell from the destination node is modifying using the computed resource management data and transmitted over the first virtual channel toward the source node. In another aspect, a data transmission apparatus regulates the transmission of data and control cells. The apparatus includes source and destination port circuitry, switching circuitry, management event circuitry, and return cell circuitry. The port circuitry couples the apparatus to links over which source and destination virtual channels can be established. The switching circuitry interconnects port circuitry and can exchange data and control cells between source and destination virtual channels. The management event circuitry is coupled to the source port circuitry to receive control cells from the source virtual channel and to compute resource management data. The return cell circuitry is coupled to the source and destination port circuitry and to the management event circuitry and can receive control cells from the destination port circuitry, modify control cells based on the resource management data computed by the management event circuitry, and provide the modified control cells to the source port circuitry for transmission over source virtual channels.

18 Claims, 3 Drawing Sheets

OTHER PUBLICATIONS

K.K. Ramkrishnan et al., ATM Flow Control: Inside the Great Debate, Data Communications of the web. Tech Tutorial, Jun. 1995, Flow control is the knotties t problem tackled by the ATM Forum to date- here's how the battle went, http://data.com/tutorials/atm_flow_control.html.

Web Lounge- Information Systems Professionals, Articles-Asynchronous Transfer Mode (ATM) "Adjustable Cell Rates for ATM Networks", http://frontpage.webzone.net/sburrow/atm.html.

* cited by examiner

DATA CELL TRAFFIC MANAGEMENT

Priority based on provisional patent application, Ser. No. 60/098,081 filed Aug. 27, 1998 entitled "Distributed Event Based ABR Traffic Management In ATM Switches" is claimed.

BACKGROUND INFORMATION

The present invention relates to the transmission of asynchronous transfer mode (ATM) cells.

Asynchronous transfer mode (ATM) data transfer is a communication technology in which fixed-size packets of data, known as "cells," are transferred between ATM switching devices ("switches"). ATM switches may be thought of as circuit oriented, low-overhead packet switches providing virtual channels. The virtual channels provide the basis for both switching and multiplexed transmission. Asynchronous time division (ATD) and fast packet switching are alternate terms which have been employed to describe similar transfer technology.

ATM networks transfer information using a cell format that typically conforms to formats adopted by the International Telecommunications Union (ITU). ITU-standard ATM cells have a 5-byte header field and a 48-byte payload field. The header field carries information pertaining to the transport and routing of an ATM cell through the switching equipment in a communications network. The payload field is available to transfer user-data. User-data may be, for example, digitized video or audio, data from a computer application, or information provided by a higher layer communication protocol.

ATM cells are sent from originating network access equipment, typically located at a customer's premises, to an ATM network and from the ATM network to destination network access equipment, typically located at a second customer's premises. The ATM network provides end-to-end routing of the ATM cells.

SUMMARY

Data traffic management in an asynchronous transfer mode network may be accomplished using forward and backward resource management cells. Calculating rate control data to be placed in backward resource management cells can be complex and may require significant processing resources. Consequently, preparing resource management data prior to the arrival of a backward resource management cell at a network switching device can reduce processing delays.

In general, in one aspect, the invention features a method for controlling data cell transmission in a network. The control method can be implemented at a network element through which data cells are transferred between source and destination nodes. The method includes receiving a control cell on a virtual channel from a source node, generating a management event upon receipt of the control cell, and processing the management even to compute resource management data. Upon the subsequent receipt of a control cell on a virtual channel from a destination node, the control cell from the destination node is modified using the computed resource management data and transmitted over the first virtual channel toward the source node.

Implementations may include one or more of the following features. Control cells may include asynchronous transfer mode forward resource management and backward resource management cells. After being computed, the resource management data may be stored in a database. Generating a management event may include placing virtual channel identification data in a queue and subsequently processing the queued data using a rate control algorithm to determine the resource management data. The control cell from the source node can be forwarded to the destination node prior to determining the resource management data. Resource management data may include explicit rate parameter data and congestion indicator data used when modifying control cells. Resource management data can be computed using the explicit rate indication for congestion avoidance in ATM networks (ERICA) algorithm.

In general, in another aspect, the invention features a data transmission apparatus for transmitting data and control cells between source and destination nodes over source and destination virtual channels. The apparatus includes source and destination port circuitry, switching circuitry, management event circuitry, and return cell circuitry. The port circuitry couples the apparatus to links over which source and destination virtual channels can be established. The switching circuitry interconnects port circuitry and can exchange data and control cells between source and destination virtual channels. The management event circuitry is coupled to the source port circuitry to receive control cells from the source virtual channel and to compute resource management data. The return cell circuitry is coupled to the source and destination port circuitry and to the management event circuitry and can receive control cells from the destination port circuitry, modify control cells based on the resource management data computed by the management event circuitry, and provide the modified control cells to the source port circuitry for transmission over source virtual channels.

Implementations may include one or more of the following features. The management event circuitry may include a processor connected to a memory. The memory may include stored instructions to configure the processor to compute and store resource management data. The instructions may associate resource management data with source virtual channels. The management event circuitry and the return event circuitry may be a shared processor coupled to memory circuitry. The source port circuitry and the destination port circuitry may be a shared transmission circuit coupled to a physical link.

In general, in another aspect, the invention features an asynchronous data transfer mode cell control method. The method can be implemented in a network switching element. The method includes establishing source virtual channels and destination virtual channels. Each source virtual channel is paired with a destination virtual channel to form a cell transmission path coupling a source node and a destination node through the switching element. The method also includes receiving a control cell on a first source virtual channel, generating a management event upon receipt of the control cell, processing the management event to generate resource management data, and storing the resource management data in a database. The resource management data may be associated with a first transmission path that includes a source virtual channel and its paired destination virtual channel.

Implementations may include one or more of the following advantages. Resource management data can be pre-calculated. Resource management data calculations can be shared among multiple processors. Additional advantages will become clear from the description and claims that follow.

DETAILED DESCRIPTION

In an ATM network, fixed-size packets of data, known as "cells," are transferred between ATM switching devices ("switches"). An ATM cell includes a virtual channel identifier (VCI) and virtual path identifier (VPI) that identifies a bidirectional route (known as a "virtual channel" or a "virtual circuit") between ATM network switches. Virtual channels provide the basis for both switching and multiplexed transmission. Routing of data frames between LAN nodes can be achieved by identifying a virtual channel and/or virtual path in the data frame's route designation information, converting the data frame to ATM cells, routing the cells through an ATM network using the identified virtual channel and/or virtual path, and reassembling the cell into a data frame prior to delivery of the data frame to its destination. The use of an ATM network in the routing of data frames may be transparent to the LAN nodes generating the data frame.

Figure 1:
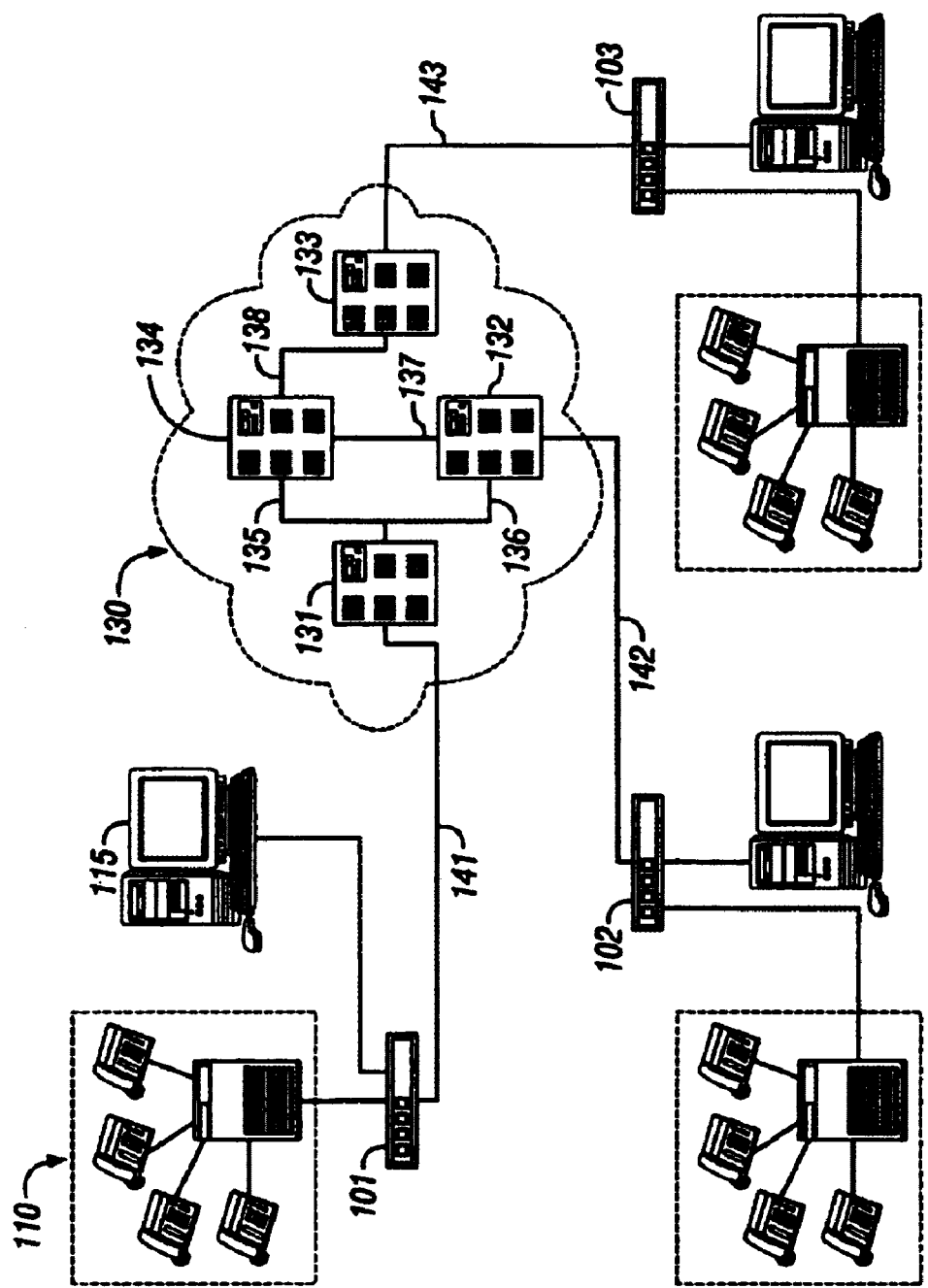
FIG. 1 shows local area networks interconnected by an ATM network.

FIG. 1 is an exemplary ATM network. ATM cells can be used to establish a communication path between network access equipment 101–103. Network access equipment 101–103 forms the originating and terminating point in an ATM communication and may convert non-ATM data traffic into an ATM format. Conversion of non-ATM data traffic to ATM cells is provided by ATM adaptation layer (AAL) services. Standard AAL services are defined in Bellcore publication GR-1113-CORE, *Asynchronous Transfer Mode and ATM Adaptation Layer (AAL) Protocols*, 1994. AAL services may be used, for example, to convert a 1.544 megabit per second continuous bit rate (CBR) circuit-oriented T1 connection to an ATM virtual circuit connection or to convert variable-length packet data traffic originating on a local area network (LAN) to ATM cells for transport on an ATM network. ATM cells are sent from network access equipment to the ATM network using a user-network interface header 225 (FIG. 2B).

Network access equipment 101–103 may combine data from multiple sources. For example, data from a LAN 115 and circuit oriented traffic, such as a T1 connection from a private branch exchange phone system (PBX) 110, may each be converted to ATM cells at network access equipment 101 and the resulting cells multiplexed over a trunk interface 141. VPI and VCI information in transmitted ATM cells is used to uniquely identify data sources and destinations at network access equipment 101 and at switches 131–134 within the ATM network 130. For example, by assigning a unique VPI/VCI value to ATM cells transporting LAN 115 data and a different VPI/VCI value to cells transporting PBX 110 data, independent routing and logical separation of the PBX 110 and LAN 115 data can be maintained.

ATM cells originating at network access equipment 101–103 are sent over trunks 141–143 to the ATM network 130. Trunk interfaces 141–143 are, for example, 45 Mbit/second T-3 interfaces or standard 155 Mbit/second fiber optic synchronous optical network optical carrier level 3 concatenated data (SONET OC-3c) interfaces. Trunks 135–138 connecting switches 131–134 may likewise use T1, T3, SONET OC-3C, or other trunk interfaces.

In a standards-compliant ATM network, ATM cells having a 53-byte format are used to communicate between the access units 101–103 and the ATM network 130. ATM cell format have been standardized by the International Telecommunications Union (ITU). ITU-standard ATM cells have a 5-byte header field and a 48-byte payload field. The header field carries information pertaining to the transport and routing of an ATM cell through the switching equipment in a communications network. The payload field is available to transfer user-data.

Figure 2A:
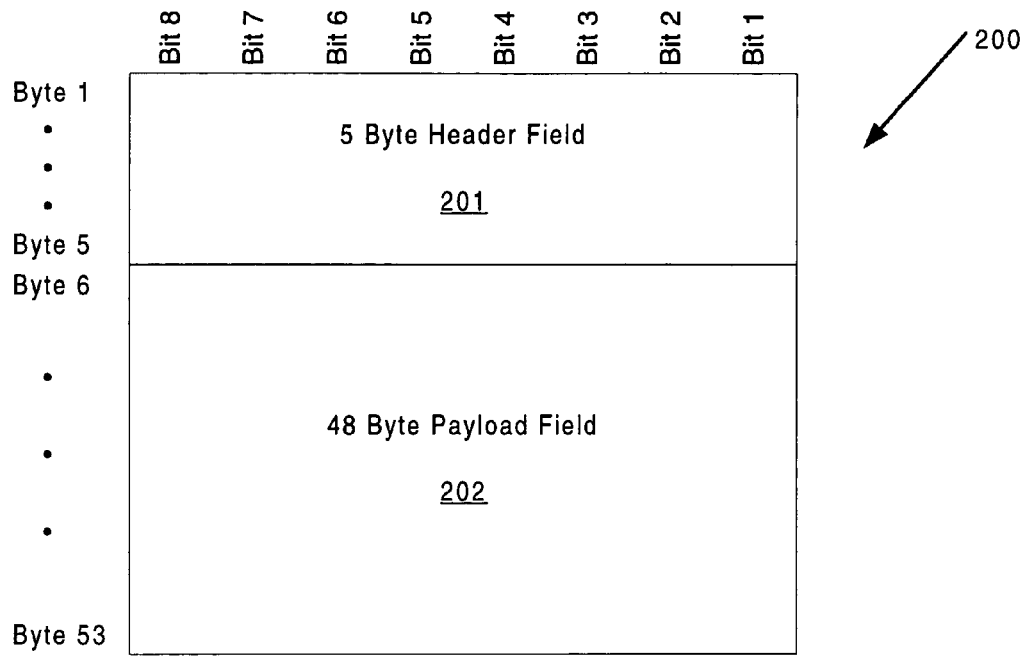
FIG. 2 is an ATM cell.
Figure 2B:
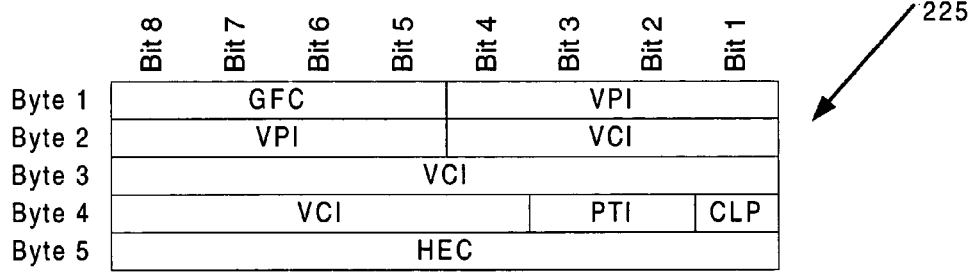
Figure 2C:
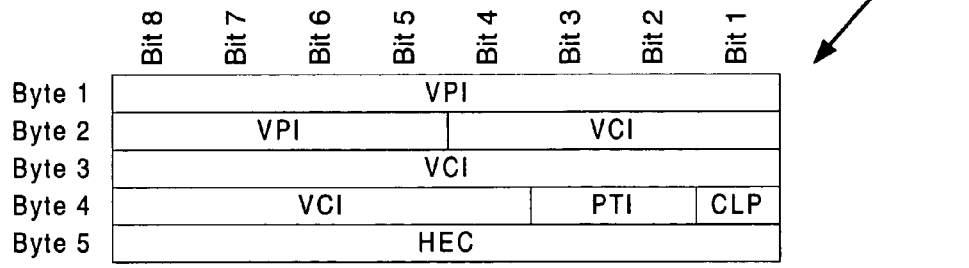

Shown in FIG. 2A is an ITU-standard 53-byte ATM cell format. The ATM cell 200 includes a header field 201 and a payload field 202. The header field 201 may be either a user-network interface header 225 (FIG. 2B) or a network—network interface header 250 (FIG. 2C). In general, ATM cells having a user-network interface header 225 are sent between ATM network access units that are located at an endpoint of an ATM connection and ATM network switching equipment. For example, ATM cells with user-network headers may be sent between access units 101–103 and switches 131–133, respectively. Cells having a network—network interface header 250 are sent between ATM switches 131–134 in the ATM network, i.e., from non-endpoint to non-endpoint ATM cell switching equipment. User-network interface headers 225 and network—network interface headers 250 include multiple information subfields and differ in the information contained in the first byte ("Byte 1") of cell header 225 and cell header 250.

A user-network header 225 includes a four-bit generic flow control (GFC) field, an eight-bit virtual path identifier (VPI) field, a sixteen-bit virtual channel identifier (VCI) field, a three-bit payload type identifier (PTI) field, a one-bit cell loss priority (CLP) field and an eight-bit header error control (HEC) field. The GFC field carries information to assist in controlling the flow of ATM cells over the user-network interface. The VPI field identifies a virtual path and the VCI field identifies the virtual channel for routing the ATM cell through a network. The PTI field identifies whether the cell contains user or network management related information. The CLP field indicates the cell loss priority. If the value of the CLP field is 1, the cell may be subject to discard, depending on network conditions such as a network overload. If the value of the CLP field is 0, the cell has high priority and therefore ATM switches should allocate sufficient network resources to prevent cell discard and ensure transport of the cell. The HEC field contains header error control information to detect transmission errors in header 201 information. Additional information on these standard header fields can be found in *ATM User-Network Interface Specification Version* 3.1, ATM Forum, 1994.

A network—network header 250, has VCI, PTI, CLP, and HEC fields with the same bit size and functionality as corresponding fields in the user-network header 225. However, since generic flow control information is not used between switches in an ATM network, the network—network header does not include a GFC field. Additionally, the network—network header has a twelve-bit VPI field allowing a larger VPI address space than is available in a user-network header.

In an ATM network, a particular VPI/VCI value in a cell header is used to route a cell between the switching ports of two connected ATM switches, but the particular VPI/VCI value does not provide for routing through multiple switches. To route a cell from one endpoint to another endpoint through multiple switches in an ATM network, VPI/VCI information must be translated at each switch. Thus, to route an ATM cell, an ATM switch performs the following steps: 1) an incoming cell's VPI/VCI information is read, 2) a switch output port providing cell transport to a destination node is determined based on the VPI/VCI information in the incoming cell's header; 3) the switch replaces the cell's VPI/VCI information with new VPI/VCI information for routing through the destination switch, and 4) the switch forwards the cell through the determined output port to the destination node. The destination switch repeats this process until the cell reaches its final destination on the ATM network.

For example, consider an ATM cell that is to be transmitted from network access unit 101 to network access unit 103. The cell may traverse a path from access unit 101 to switch 131 then through ATM switch 132, switch 134, switch 133 and finally to access unit 103. Prior to transmission of ATM cells from access unit 101 to 103, VPI/VCI translation information is established at each point in the path between 101 and 103. VPI/VCI translation information may be established by exchanging special ATM cells providing information to control processors in the various network switches or from a network management system. Next, at network access unit 101, cells are formatted with user-network interface headers and are assigned a VPI/VCI value.

In general, a particular set of VPI/VCI values is meaningful at a single switch along an end-to-end path through the ATM network. Thus, for example, the VPI/VCI values assigned by the access unit 101 allow routing between input and output ports of switch 131, but those values will not properly route the cell through switches 132–134 or through access unit 103. To enable routing along the entire end-to-end path, each ATM switch maintains a translation table used to track and translate (reassign) a cell's VPI/VCI values as the cell is transported through the switch. For example, to transport an ATM cell between access unit 101 and 103 on a path through switches 131, 132, 134, 133, VPI/VCI translation information is established at each point in the path between 101 and 103. When the cell originating at access unit 101 is received at the switch 131, the VPI/VCI information in the user-network interface header allows routing to the proper output port on the switch 131 and, prior to the cell exiting the switch 131 through that output port, the VPI/VCI information is replaced with new VPI/VCI information to allow routing through switch 132. The process of determining an output port and replacing VPI/VCI information may be repeated at each switch along the end-to-end path.

A class of service is associated with each ATM connection when the connection is established. In an ATM network based on ATM Forum standards, four classes of service have been defined. The first class, constant bit rate (CBR) specifies a fixed data rate connection. Switches in the ATM network 130 must reserve sufficient capacity to ensure that the specified data rate can be provided and may monitor incoming traffic to ensure that the connection from the user does not exceed the specified capacity. The second service class, variable bit rate (VBR) identifies both a sustained (nominal) and burst rate. In general, a VBR service will provide data at a specified nominal rate but may increase its data rate up to a specified maximum during periods of peak traffic. A third class, unspecified bit rate (UBR), may be referred to as a best-effort service. UBR connections do not guarantee network capacity, and may result in cell discard. Finally, a fourth class, available bit rate (ABR) guarantees a minimum capacity and, when additional network capacity is available, allows bursts above the minimum rate without risk of cell loss.

ABR and UBR connections are commonly used for LAN internetworking and other types of data traffic. UBR is directed at delay-tolerant applications and provides for no feedback or control over network congestion. ABR is commonly used for applications having particular delay bounds that should be obeyed. An application using ABR specifies a peak cell rate (PCR) that it will use and a minimum cell rate (MCR) that it requires. The network 130 allocates resources so that all ABR connections receive at least their MCR capacity. Any unused capacity may be shared among all ABR sources.

To control traffic on ABR connections, a feedback mechanism is used so that ABR traffic transmission remain within the available network capacity. The feedback mechanism uses forward resource management (FRM) and backward resource management (BRM) cells to control network utilization. FRM and BRM cells are multiplexed with data cells on an ATM connection. A source node may maintain a substantially constant ration of FRM cells to data cells. For example, the source node may transmit one FRM cell for every N data cells (with a typical value of N being 31). Each FRM cell includes resource management (RM) data. RM data includes a congestion indicator (CI) field, a no-increase (NI) field, and may also include an explicit rate (ER) field. The source node typically sets the CI field to a value indicating that there is no congestion and the NI field to a value indicating whether a data rate increase is desired or not. Additionally, the source node may set ER field values to indicate an explicit transmission rate in a range between the initial cell rate (ICR) established for the virtual channel connection and the peak cell rate (PCR) for the connection. As each FRM cell is received at the destination node, it is turned around and transmitted back to the source node as a BRM cell. The destination node and/or any other ATM network element along the virtual connection may change the CI, NI, and ER field in the BRM cell in order to specify the transmission rate constraints that the source should adhere to. Resource management cells are more fully described in Traffic Management Specification Version 4.0, Document # af-tm-0056.000, The ATM Forum Technical Committee, April 1996.

A source node may receive rate-control feedback from a destination node or an ATM network 130 (FIG. 1) element through which a virtual channel from the source passes. A number of rate control mechanisms can be used to detect and report congestion at various points along a virtual channel. For example, a switch can set the explicit forward congestion indication (EFCI) condition in an ATM data cell header (using the payload type field) being transmitted in a forward direction. In response, the destination system may set the CI bit in a BRM cell to indicate network congestion. A switch may also directly set the CI or NI bit in a forward or backward resource management cell to indicate that there is congestion in the network. If the CI or NI bit is sent in a FRM cell, the bit will remain set in BRM cells. Additionally, a switch can modify the ER field value in a FRM or BRM cell.

Figure 3:
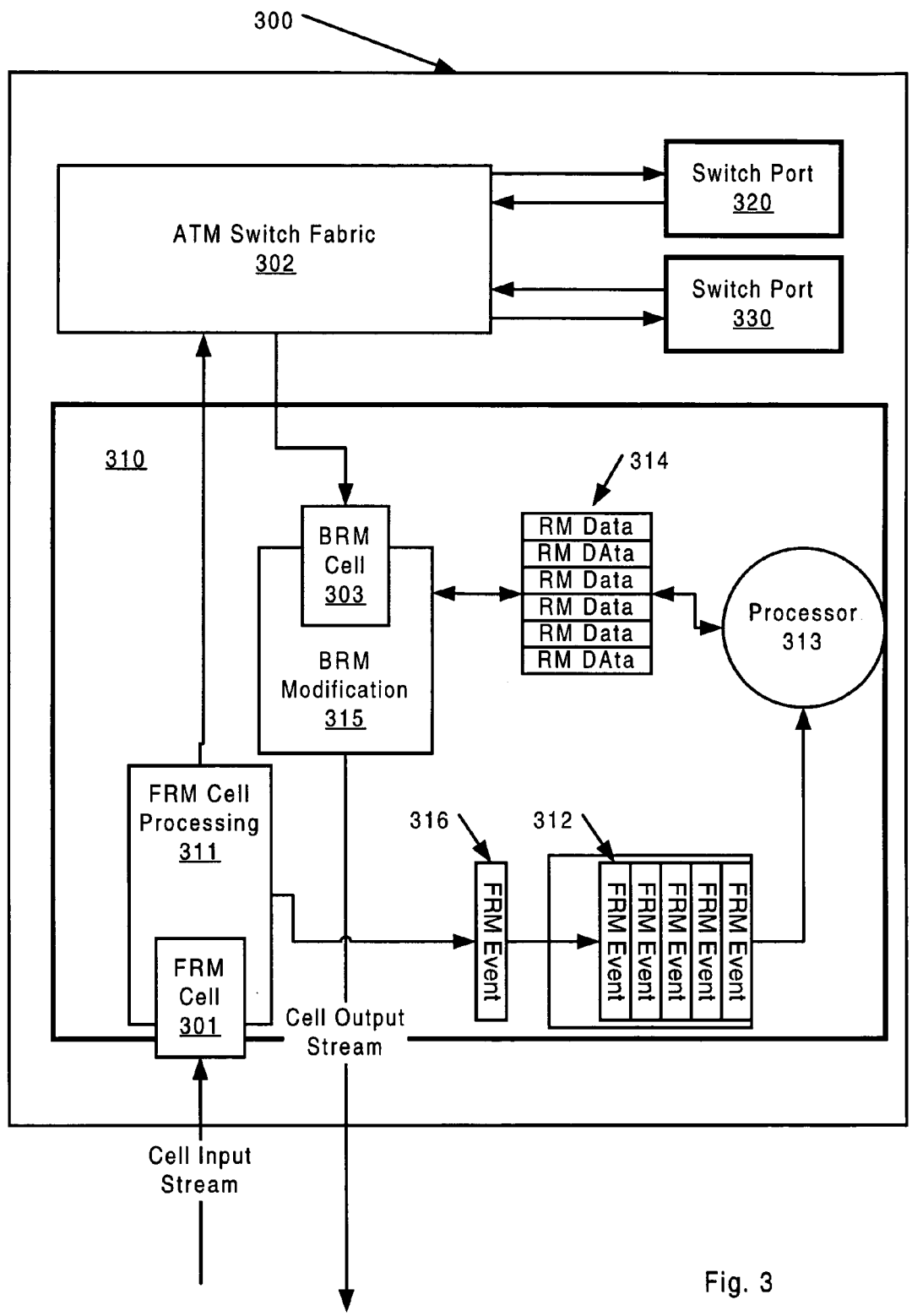
FIG. 3 illustrates an ATM switch.

FIG. 3 illustrates an ATM switch 300 providing resource management services. The switch 300 has three ports 310, 320, 330 connecting physical links to the switch 300. ATM cells sent to or from a port 310, 320, or 330 are processed by port circuitry and may be switched among ports by switching fabric 302. Each port includes, among other things, circuitry to process FRM 301 cells arriving from source nodes and BRM 303 cells directed back to the source nodes. The processing circuitry of port 310 is shown in detail and includes circuit elements 311–315. Ports 320, 330 may include circuitry similar to the circuitry of port 310 or, in a shared implementation, ports 320 and 330 may share one or more elements of circuitry 311–315 with port 310. For example, the processor 313, queue 312 and database 314 may be shared by all of the ports 310, 320, 330.

The switch 300 can provide congestion control feedback to a source node by inserting or modifying resource management (RM) data in BRM cells. The switch 300 determines the appropriate RM data for the BRM cells based on both RM data in BRM cells that arrive at the switch 300 from other network 100 (FIG. 1) elements, and on RM data computed at the switch and stored in a database 314. For each virtual channel processed by the switch 300, the database 314 includes a resource management record (RM record). As explained below, resource management data (RM data) in each RM record is calculated based on, among other things, the processing of FRM cells by the switch 300. RM records in the database 314 reflect resource utilization and other congestion factors affecting the virtual channel connection between a source node and the switch 300.

As BRM cells pass through the switch 300 on a virtual channel back to a source node, the cells 303 are provided to BRM cell modification circuitry 315. The circuitry 315 can compare RM data in a BRM cell 303 with RM data in the database 314. To compare RM data in the cell 303 with RM data in the database 314, the circuitry 315 reads virtual channel (VPI/VCI) information from the cell 303 and retrieves a RM record associated with that virtual channel from the database 314. Based on the comparison between the data in the cell 303 and the data retrieved from the database 314, the circuitry 315 determines whether the RM data in the cell 303 is to be modified. In general, if the RM data in the cell 303 indicates a higher data rate than is indicated by the RM data in the database 314, the rate indicated by the cell 303 is lowered. On the other hand, if the RM data in the cell 303 indicates a lower rate than that in the database 314, the RM data in the cell 303 is not modified.

RM data in the database 314 is derived from the processing of data in FRM cells. As ATM cells pass through the port 310, they are provided to FRM cell processing circuitry 311. The circuitry 311 can detect FRM cells on each virtual channel processed by the port 310. When a FRM cell 301 is detected by the circuitry 311, the circuitry 311 generates a FRM event 316 and places the FRM event 316 in a queue 312. The FRM event 316 includes the FRM cell 301 data elements that are used in the calculation and updating of RM data in the database 314. An FRM event 316 may include virtual channel (VPI/VCI) data alone or may include virtual channel data along with other RM data and other cell 301 header and/or payload values. After the circuitry 311 has read needed data values from the cell 301, the cell 301 may be sent to other switch components, such as the switching fabric 302 for further switch 300 processing.

A processor 313 retrieves FRM events from the queue 312, calculates RM data using a RM algorithm, and places the RM data in a database 314 RM record. In a multi-processor implementation, the processor 313 may consist of multiple processors each cooperating to calculate explicit rate data. For example, in a multi-processor implementation, the queue 312 may consist of n sub-queues each of which is associated with a separate one of n processors. Data placed in a sub-queue may be processed by the particular one of n processors associated with the sub-queue. In a shared-queue multiprocessor implementation, multiple processors may each access a particular queue and function together to process data in that queue. The RM algorithm may be the explicit rate indication for congestion avoidance in ATM networks (ERICA) algorithm as is described in U.S. Pat. No. 5,805,577, the congestion control with explicit rate indication algorithm described in U.S. Pat. No. 5,633,859, or other algorithm. The RM algorithm determines RM data based on FRM event 316 data. In some implementations, the RM algorithm may also use BRM cell data, previous RM data values, data reflecting the congestion state of the switch 300, or other data values in the calculation of the RM data. After the processor 313 calculates the RM data for a virtual channel, a database 314 RM record corresponding to that channel is updated. In some implementations, the RM data records in the database 314 include fields that correspond to the fields of a BRM cell 303.

The database 314 may be implemented using a variety of database techniques. For example, in a contents addressable memory (CAM) implementation, RM Data is stored in a CAM memory device that is accessed using VPI and/or VCI values. Alternatively, the database 314 may consist of an area of RAM memory accessible by the processor 313 and the BRM modification circuitry 315 that can be searched using a sequential or non-sequential algorithm. Still other database 314 implementations may be used.

Modification circuitry 315 may be a general purpose processor or special purpose circuitry configured to modify BRM cells. In a processor-based implementation, one or more of the FRM processing, queuing, RM algorithm execution, database storage, and BRM processing functions described with respect to circuit elements 311–315 may be performed by a special or general-purpose processor rather than by a separate circuit element 311–315. In an arrival-time independent implementation, the calculation of RM data in the database 314 is performed independent of the arrival of FRM and BRM cells. For example, since FRM events are queued in queue 312, the processor 313 may complete RM algorithm calculations for a given FRM event after the FRM cell associated with that FRM event has departed the switch 300.

In the exemplary implementation described above, RM data generation and BRM cell alteration was described with respect to port 310 elements. Implementations may also perform RM data generation and BRM cell alteration at other switch 300 elements. For example, FRM Event 316 may be generated in response to FRM cell switching by the switching fabric 302 and, likewise, BRM cell modification may occur during BRM cell switching by the switching fabric 302. Non-switch implementations may also be used. For example, RM data generation and BRM cell alteration may occur within an ATM add-drop multiplexer, in an ATM over SONET digital cross-connect device, or in another ATM network 130 (FIG. 1) device. Implementations may also include a single port attached to a single physical link shared by both source and destination virtual channels.

The invention may be implemented using digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

What is claimed is:

1. A method comprising:
   receiving a forward resource management control cell in a network switch;
   forwarding the forward resource management control cell to a destination node;
   determining, after said forwarding, rate-based, flow-control data in the network switch, in response to receipt of the forward resource management control cell corresponding to a connection linking a source node and the destination node via the network switch;
   storing the rate-based, flow-control data in the network switch before receipt of a backward resource management control cell in the network switch;
   receiving in the network switch, from the destination node, the backward resource management control cell corresponding to the forward resource management control cell; and
   modifying in the network switch the backward resource management control cell, before forwarding the backward resource management control cell to the source node, based on the rate-based, flow-control data determined in response to the receipt of the forward resource management control cell.

2. The method of claim 1, wherein the forward resource management control cell comprises an asynchronous transfer mode forward resource management control cell and the backward resource management control cell comprises an asynchronous transfer mode backward resource management control cell.

3. The method of claim 1, further comprising:
   retrieving the rate-based, flow-control data from a database using virtual channel data associated with the backward resource management control cell.

4. The method of claim 1, further comprising:
   placing a management event record corresponding to the forward resource management control cell in a queue;
   removing the management event record from the queue; and
   processing the management event record using a rate control algorithm to produce the rate-based, flow-control data.

5. The method of claim 4, wherein the management event record comprises virtual channel identification data corresponding to the forward resource management control cell, and said forwarding the forward resource management control cell occurs before said removing the management event record from the queue.

6. The method of claim 4, wherein processing the management event record comprises processing the management event record using explicit rate indication for congestion avoidance in ATM networks (ERICA) algorithm.

7. The method of claim 1, wherein the rate-based, flow-control data comprises explicit rate parameter data, and modifying the backward resource management control cell comprises inserting the explicit rate parameter data in the backward resource management control cell.

8. The method of claim 1, wherein the rate-based, flow-control data comprises a congestion indicator, and modifying the backward resource management control cell comprises setting a congestion indicator bit in the backward resource management control cell in accordance with the congestion indicator.

9. A data transmission apparatus comprising:
   source port circuitry operative to send and receive control cells on a source virtual channel;
   destination port circuitry operative to send and receive control cells over a destination virtual channel;
   switching circuitry operatively coupling the source port circuitry and the destination port circuitry, the switching circuitry comprising circuitry to exchange data cells and control cells between the source virtual channel and the destination virtual channel;
   management event circuitry operatively coupled to the source port circuitry to receive control cells from the source virtual channel and to compute rate-based, flow-control data in response to receipt of a forward resource management control cell that corresponds to a connection linking a source node and a destination node via the data transmission apparatus, wherein the computation of the rate-based, flow-control data occurs after forwarding of the forward resource management control cell and the computed rate-based, flow-control data is stored before receipt of a backward resource management control cell corresponding to the forward resource management control cell; and
   return cell circuitry operatively coupled to the source and destination port circuitry and to the management event circuitry, the return cell circuitry comprising circuitry to receive control cells from the destination port circuitry, to modify a backward resource management control cell based on the rate-based, flow-control data computed by the management event circuitry, and to provide the modified backward resource management control cell to the source port circuitry for transmission over source virtual channels.

10. The apparatus of claim 9, wherein the management event circuitry comprises a processor connected to a memory, the memory comprising stored instructions to configure the processor to compute and store resource management data.

11. The apparatus of claim 10, wherein the instructions to configure the processor comprise instructions to associate rate-based, flow-control data with source virtual channels.

12. The apparatus of claim 9, wherein the management event circuitry and the return cell circuitry comprise a shared processor coupled to memory circuitry.

13. The apparatus of claim 9, wherein the source port circuitry and the destination port circuitry comprise shared transmission circuitry coupled to a physical link.

14. The apparatus of claim 9, wherein data cells and control cells are fixed-sized asynchronous transfer mode cells.

15. A network switch comprising:
   means for sending and receiving control cells and data cells over a connection linking a source node and a destination node via the network switch;
   means for initiating preparation of rate-based, flow-control data in response to receipt of a forward resource management cell from the source node and before receipt of a backward resource management cell corresponding to the forward resource management control cell, wherein preparation of the rate-based, flow-control data occurs after forwarding of the forward resource management cell and the prepared rate-based, flow-control data is stored before receipt of the backward resource management cell; and means for modifying the backward resource management cell upon receipt using the prepared resource management data.

16. The network switch of claim 15, wherein the means for initiating preparation of resource management data comprises:

means for generating forward resource management (FRM) events from FRM cells in response to receipt of the FRM cells; and means for storing the FRM events for later processing.

17. The network switch of claim 16, wherein the means for generating the FRM events comprises means for extracting virtual channel data from the FRM cells, and the means for storing the FRM events comprises a queue.

18. The network switch of claim 16, wherein the means for modifying the backward resource management cell comprises;

means for storing resource management data prepared using the FRM events; and means for comparing received backward resource management (BRM) cells with the stored resource management data to determine whether to modify the BRM cells before forwarding.

* * * * *